United States Patent [19]
Denzinger

[11] Patent Number: 5,148,096
[45] Date of Patent: Sep. 15, 1992

[54] CHARGING METHOD FOR BATTERIES
[75] Inventor: Wolfgang Denzinger, Friedrichshafen, Fed. Rep. of Germany
[73] Assignee: Dornier GmbH, Fed. Rep. of Germany
[21] Appl. No.: 710,050
[22] Filed: Jun. 6, 1991
[30] Foreign Application Priority Data
Jun. 7, 1990 [DE] Fed. Rep. of Germany ....... 4018223
[51] Int. Cl.$^5$ .............................. H02J 7/04; H02J 7/16
[52] U.S. Cl. ........................................................ 320/32
[58] Field of Search ........................... 320/9, 30, 31, 32
[56] References Cited
U.S. PATENT DOCUMENTS

| 4,745,349 | 5/1980 | Palinisamy et al. | 320/32 X |
| 4,952,861 | 8/1990 | Horn | 320/32 X |

FOREIGN PATENT DOCUMENTS
3732339  9/1987  Fed. Rep. of Germany .

OTHER PUBLICATIONS
Patent Abstracts of Japan (57-96474)-Jun. 15, 1982.
NASA Reference Publication 1052-"Sealed-Cell Nickel-Cadmium Battery Applications Manual"; Dec. 1979.

Primary Examiner—Steven L. Stephan
Assistant Examiner—E. H. To
Attorney, Agent, or Firm—Evenson, Wands, Edwards, Lenahan & McKeown

[57] ABSTRACT

A charging method for accumulators in two phases, the first phase being a constant current charging up to a given value of the battery voltage and, in the second phase, the battery voltage being limited as a function of the charging current.

3 Claims, 1 Drawing Sheet

CHARGING METHOD FOR BATTERIES

BACKGROUND AND SUMMARY OF THE INVENTION

The present invention relates to a charging method for batteries in two phases, with a first phase being a constant current charging up to a given value of the battery voltage.

In satellites on near-earth paths, a two-phase "taper" charging method is normally used for the charging of the batteries (or "accumulators"). In the first phase of this taper charging method, the battery is charged with a constant current until a given voltage level (the "charge end voltage") is reached. In the second phase, the voltage is kept constant while the charging current decreases (the "taper phase"). As a rule, the voltage level is automatically adapted also to the battery temperature ($-2,3$ mV/$_{cell\cdot°C}$) and can, in addition, also be changed by command in order to compensate for aging processes of the battery.

In the German Patent Document DE-OS 37 32 339, a charging method in three phases is described, the first two phases corresponding to the taper method. During the third phase, depending on the charging condition of the battery, current or voltage is increased to a constant value in order to achieve the complete charging of the battery.

A charging method in two phases is described in the Japanese Patent Document JP 57-96474(A). In this method, the charging during the first phase takes place with a constant charging current, whereas, in the second phase, it takes place with a constant battery voltage. The second phase is continued until the current rises, this rise serving as a terminating criterion for the charging operation.

In satellites, the charging duration is determined by the duration of the phase during which the satellite on its orbit is exposed to the sun. In the case of lower orbiting paths, the charging duration is less than one hour so that the charging must take place at comparatively high charging currents. Since approximately 6,000 charging and discharging cycles per year takes place on these orbits, a quick-charging method is required in which it is ensured that the battery is not overcharged and thus is thermally stressed as little as possible.

It is an object of the present invention to provide a charging method by which a fast, reliable and nevertheless gentle complete charging of the battery can be achieved.

This and other objects are achieved by the present invention which provides a charging method for batteries comprising a first phase being a constant current charging up to a given value of the battery voltage U, and a second phase in which the battery voltage U is limited as a function of a charging current $i_L$. The following relationship exists in the present invention between the battery voltage U and the charging current $i_L$:

$$U = U_o + \Delta U$$

wherein
$U_o$ = current-independent part of the battery voltage U,
$\Delta U$ = current-dependent part of the battery voltage U $$\Delta U = f \cdot i_L \cdot R_i$$

with
f = factor smaller than 1
$i_L$ = charging current
$R_i$ = internal resistance of the battery.

According to the present invention, the known "taper" charging method is expanded by a current dependent change of the battery voltage during the second phase so that a higher battery voltage is permitted at a higher charge current than at a low charge current. The battery voltage is divided into a current-dependent and a current-independent part. Only the current-dependent part, which is adapted to the internal-resistance $R_i$ of the battery, can be changed.

In practice, the following adjustment has had good results:

$$\Delta U = 0.8 \cdot i_L \cdot R_i.$$

In the case of this adjustment, approximately ~80% of the internal resistance of the battery is compensated. A hundred-percent compensation is not possible because it would lead to instabilities of the control circuit.

When the new charging method is used, an extensive independence of the charging factor (=ratio of charged charge in ampere-seconds to removed charge in ampere-seconds) from varying charging currents and varying discharge depths is obtained. As a result, the thermal stress to the battery is minimized, and the useful life is therefore optimized. Practical tests have shown that a changing of the charging/discharging times from 55/37 min. to 68/24 min. in the case of identical currents resulted in a change of the charging factor of only from 1.03 to 1.07. In the case of high charging factors, the charging current, at the end of the charging phase, produces essentially stray power which leads to a rise in temperature.

The method according to the invention is suitable for all batteries in satellites as well as for terrestrial applications, for example, in tools, video cameras, or the like. It is particularly suitable for NiCd- and NiH$_2$-batteries.

Other objects, advantages and novel features of the present invention will become apparent from the following detailed description of the invention when considered in conjunction with the accompanying drawings.

DETAILED DESCRIPTION OF THE DRAWINGS

Figure 1:
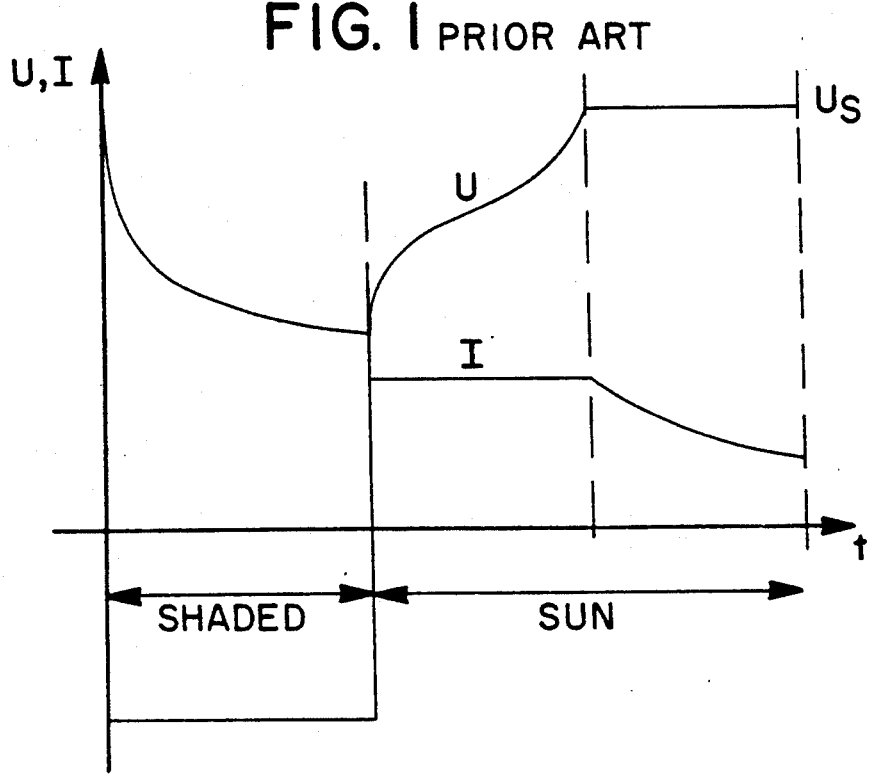
FIG. 1 shows the time-related course of the charging current and the charging voltage of the prior art.
Figure 2:
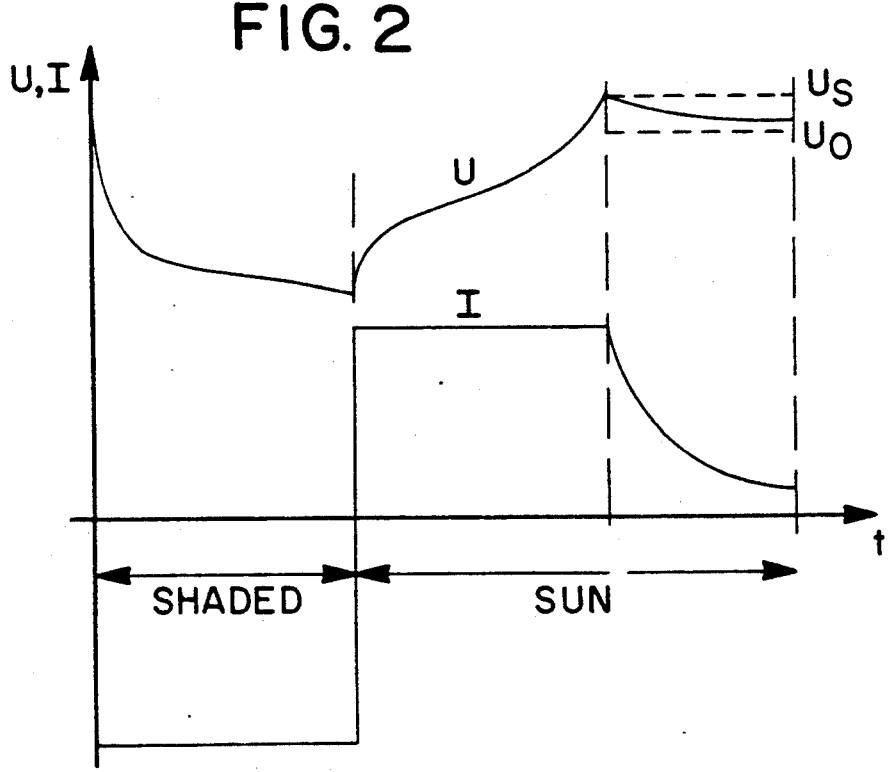
FIG. 2 shows the time-related course of the charging current and the charging voltage using a charging method according to the present invention.

FIGS. 1 and 2 illustrate time-related courses of charging current and the charging voltage. The apparatus used for this charging is conventional, and as such, will not be illustrated or discussed so as not to obscure the invention.

FIG. 1 illustrates, in an application in a satellite, the discharging in the shaded phase and the subsequent charging when the satellite arrives in the sun. In the case of the charging method of the prior art, the first phase is a charging with a constant current conduction I. This phase lasts until a given value is reached of the battery voltage U, the charge end voltage $U_s$. At the second phase of the charging, a continued constant charging takes place with this voltage $U_s$. As shown in FIG. 1, the charging current I decreases in the process.

FIG. 2 shows the course of the charging current I and the battery voltage U according to the process of the present invention. The shaded phase shown on the left is the same as in the prior art, with a discharging with a negative current I and a drop of the battery voltage U. The start of the charging now takes place, as in the prior art, with a first phase with a constant current charging in which case the charging takes place again up to a given charge end voltage $U_s$. The charge end voltage $U_s$ is identical to or higher than $U_s$ of FIG. 1. The second phase now takes place with an initially high voltage which is reduced here when the current I decreases. Compared to the method according to FIG. 1, this leads to a significantly higher decrease of the charging current. In the second phase, the battery voltage U may maximally decrease by the current-dependent part $\Delta U$.

The charging method of the prior art (FIG. 1) can be optimized only for a specific charging current and for fixed times for charging and discharging. In particular, the battery will be overcharged when the charging current is lower, the discharging depth is less or the charging time is extended. By contrast, in the method of the present invention according to FIG. 2, the battery voltage U is adapted to the charging current. For this reason no overcharging takes place in the case of smaller charging current. When the charging time is extended or in the case of smaller discharging depths, the overcharging is small because the taper current is reduced to very small values.

What is claimed:

1. A charging method for batteries comprising:
   a first phase being a constant current charging up to a given value of a battery voltage U; and
   a second phase in which the battery voltage U is limited as a function of a charging current $i_L$, the following relationship existing between the battery voltage U and the charging current $i_L$:

$$U = U_o + \Delta U$$

wherein
   $U_o$ = current-independent part of the battery voltage U,
   $\Delta U$ = current-dependent part of the battery voltage U $$\Delta U = f \cdot i_L \cdot R_i$$

with
   f = factor smaller than 1
   $i_L$ = charging current
   $R_i$ = internal resistance of the battery.

2. The method of claim 1, wherein f is between 0.5 and 1.

3. The method of claim 2, wherein f is 0.8.

* * * * *